United States Patent
Chiu (10) Patent No.: US 11,016,177 B2
(45) Date of Patent: May 25, 2021

(54) METHOD FOR ESTIMATING OBJECT DISTANCE AND ELECTRONIC DEVICE

(71) Applicant: Wistron Corporation, New Taipei (TW)

(72) Inventor: Chih-Hao Chiu, New Taipei (TW)

(73) Assignee: Wistron Corporation, New Taipei (TW)

( * ) Notice: Subject to any disclaimer, the term of this patent is extended or adjusted under 35 U.S.C. 154(b) by 526 days.

(21) Appl. No.: 15/970,849

(22) Filed: May 3, 2018

(65) Prior Publication Data

US 2019/0212415 A1  Jul. 11, 2019

(30) Foreign Application Priority Data

Jan. 10, 2018  (TW) .................. 107100922

(51) Int. Cl.
| | |
|---|---|
| *G06T 7/507* | (2017.01) |
| *G01S 7/48* | (2006.01) |
| *G06T 7/514* | (2017.01) |
| *G01S 17/08* | (2006.01) |
| *G06T 7/55* | (2017.01) |

(52) U.S. Cl.
CPC ............ *G01S 7/4808* (2013.01); *G01S 17/08* (2013.01); *G06T 7/507* (2017.01); *G06T 7/514* (2017.01); *G06T 7/55* (2017.01); *G06T 2207/10028* (2013.01)

(58) Field of Classification Search
None
See application file for complete search history.

(56) References Cited

U.S. PATENT DOCUMENTS

| | | | |
|---|---|---|---|
| 6,396,397 B1* | 5/2002 | Bos ....................... | G01J 1/4228 340/461 |
| 9,335,255 B2* | 5/2016 | Retterath ........... | G06K 9/00818 |
| 2010/0013615 A1* | 1/2010 | Hebert .................. | B60Q 9/006 340/425.5 |
| 2016/0098841 A1* | 4/2016 | Sekiguchi .......... | G01B 11/2513 382/106 |

* cited by examiner

*Primary Examiner* — Hovhannes Baghdasaryan
(74) *Attorney, Agent, or Firm* — JCIPRNET (57) ABSTRACT

In an embodiment, a method for estimating an object distance is used by an electronic device including a light sensor. The method includes: detecting, by the light sensor, a light reflected from an object; establishing an object brightness table according to the detected light, where the object brightness table records brightness information of the light corresponding to a plurality of pixel locations; analyzing the object brightness table and a plurality of base brightness tables to obtain differential quantitative information and obtaining a target base distance corresponding to a target base brightness table among the base brightness tables according to the differential quantitative information; and determining a distance between the electronic device and the object according to the target base distance.

20 Claims, 7 Drawing Sheets

METHOD FOR ESTIMATING OBJECT DISTANCE AND ELECTRONIC DEVICE

CROSS-REFERENCE TO RELATED APPLICATION

This application claims the priority benefit of Taiwan application serial no. 107100922, filed on Jan. 10, 2018. The entirety of the above-mentioned patent application is hereby incorporated by reference herein and made a part of this specification.

BACKGROUND

Technical Field

The disclosure relates to a method for estimating an object distance; more particularly, the disclosure relates to a method and an electronic device for estimating an object distance through detection and comparison of brightness information of light reflected by an object.

Description of Related Art

In general, techniques used to calculate an object distance (or depth) include stereo vision, structure light detection, and time of flight (TOF) detection. The technique of stereo vision is to simulate human eyes' parallax to measure the true distance to distant objects. Structure light detection is to use projected light to scan surfaces of distant objects, so as to measure the true distance to the distant objects. TOF detection is to calculate the transmission time of light emission and reflection, so as to measure the true distance to the distant objects.

Since said techniques are applied to measure the true distance to the distant objects, precise or expensive instruments and complicated calculations are required. If the needed estimation of the distances to distant objects is a rough estimation, or it is intended to learn approximate changes to the distances to the distant object, the foregoing techniques may lead to inconvenience and increase system computational burden or construction costs.

SUMMARY

The disclosure provides a method for estimating an object distance and an electronic device, so as to roughly estimate a distance from a distant object to the electronic device.

In an embodiment, a method for estimating an object distance is used by an electronic device including a light sensor. The method includes: detecting, by the light sensor, a light reflected from an object; establishing an object brightness table according to the detected light, where the object brightness table records brightness information of the light corresponding to a plurality of pixel locations; analyzing the object brightness table and a plurality of base brightness tables to obtain differential quantitative information and obtaining a target base distance corresponding to a target base brightness table among the base brightness tables according to the differential quantitative information; and determining a distance between the electronic device and the object according to the target base distance.

In another embodiment, an electronic device including a light sensor, a storage circuit, and a processor is provided. The processor is coupled to the light sensor and the storage circuit. The processor is configured to detect, by the light sensor, a light reflected by an object and establish an object brightness table according to the detected light, and the object brightness table records object brightness information of the light corresponding to a plurality of pixel locations. The processor is further configured to analyze the object brightness table and a plurality of pre-established base brightness tables to obtain differential quantitative information; according to the differential quantitative information, the processor obtains a target base distance corresponding to a target base brightness table chosen from the base brightness tables. The processor is further configured to determine the distance from the object to the electronic device according to the target base distance.

In view of the above, after the light sensor detects the light reflected by the object, the object brightness table may be established according to the detected light, and the object brightness table records the object brightness information of the light corresponding to a plurality of pixel locations. Through analyzing the object brightness table and the base brightness tables, the differential quantitative information may be obtained. The differential quantitative information may be applied to determine a target base distance, and the distance from the object to the electronic device may be determined according to the target base distance. As such, the light sensor may be applied together with simple algorithm to roughly estimate the distance from the distant object and the electronic device according to one or more embodiments of the disclosure.

To make the above features and advantages provided in one or more of the embodiments of the disclosure more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles described herein

FIG. 4 and FIG. 5 are schematic views illustrating actions taken at an application stage according to an embodiment of the disclosure.

DETAILED DESCRIPTION OF THE DISCLOSURE

Figure 1:
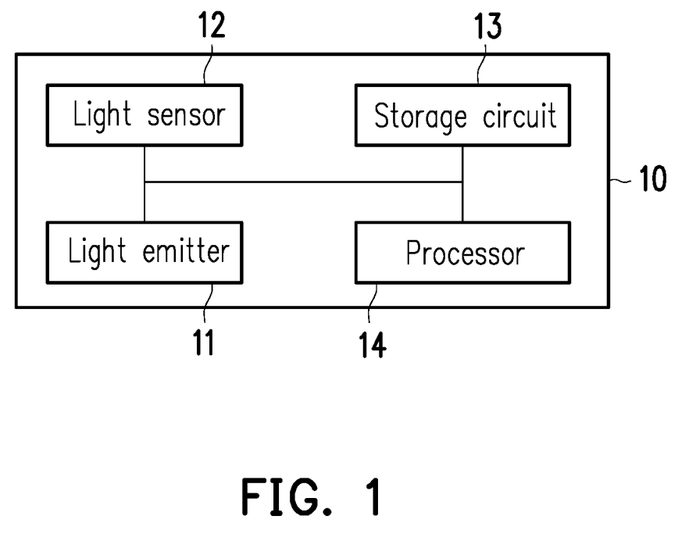
FIG. 1 is a schematic view of an electronic device according to an embodiment of the disclosure.

FIG. 1 is a schematic view of an electronic device according to an embodiment of the disclosure. With reference to FIG. 1, an electronic device 10 includes a light emitter 11, a light sensor 12, a storage circuit 13, and a processor 14. The light emitter 11 is configured to emit the light. For instance, the light emitter 11 may emit infrared light. The light sensor 12 includes one or more optical detectors, such as an optical lens. For instance, the light sensor 12 may detect infrared light emitted by the light emitter 11 and reflected back from certain object (also referred to as a target object). In this embodiment, the number of the light sensor 12 is less than the number of the light emitter 11. For instance, the number of the light emitters 11 may be two, and the number of the light sensor 12 may be one. However, in another embodiment, the number of the light emitter 11 and/or the number of the light sensor 12 may be adjusted according to actual requirements.

The storage circuit 13 includes a hard disk drive (HDD), a solid state drive (SSD), a read only memory (ROM), or any other non-volatile storage circuit, so as to store data and programs in a non-volatile manner. In an embodiment, the storage circuit 13 may include a random access memory (RAM) or any other volatile storage circuit, so as to temporarily store transient data generated during the operation of the electronic device 10.

The processor 14 is coupled to the light emitter 11, the light sensor 12, and the storage circuit 13. The processor 14 may be a central processing unit (CPU), a programmable general-purpose or special-purpose microprocessor, a digital signal processor (DSP), a programmable controller, an application specific integrated circuit (ASIC), a programmable logic device (PLD), any other similar device, or a combination of said devices. In the present embodiment, the processor 14 may control the light emitter 11 and the light sensor 12 and perform processing and operation steps associated with a method for estimating an object distance. In another embodiment, the processor 14 may also control other operations of the electronic device 10.

The electronic device 10 provided in the embodiment may be a smart phone, a tablet computer, a notebook computer, a desktop computer, a smart television, a head-mounted display device, and any other electronic device capable of transmitting light, detecting light, calculating brightness of light, and estimating distance. Besides, in an embodiment, one or both of the light emitter 11 and the light sensor 12 may be disposed outside the electronic device 10 and connected to the processor 14 through a certain connection interface.

In the present embodiment, the method for estimating the object distance may be roughly divided into two stages. The first stage is the preparation stage, and the second stage is the application stage. In the preparation stage, the processor 14 may establish a plurality of brightness tables (also referred to as base brightness tables) and store the established base brightness tables in the storage circuit 13. Each base brightness table corresponds to one certain level (also referred to as distance level) and is configured to record brightness information (also referred to as base brightness information) of the light detected by the light sensor 12 at the certain distance level, and the base brightness information corresponds to a plurality of pixel locations.

In the application stage, the processor 14 may establish a brightness table (also referred to as an object brightness table) according to the light actually detected by the light sensor 12 and store the object brightness table in the storage circuit 13. The object brightness table is configured to record brightness information (also referred to as object brightness information) of the detected light, and the object brightness information corresponds to a plurality of pixel locations. The processor 14 may analyze the object brightness table and a plurality of pre-established base brightness tables to obtain differential quantitative information; according to the differential quantitative information, the processor 14 may obtain a base distance (also referred to as a target base distance) corresponding to one of the base brightness tables (also referred to as a target base brightness table). The processor 14 may then determine the distance from the object to the electronic device 10 according to the target base distance.

In other words, the base brightness table is established in the preparation stage, and the distance from the object to the electronic device 10 is actually determined in the application stage. The determined distance is an estimated (rough) distance according to the brightness of the detected light. In the present embodiment, the light sensor 12 is presumed to be disposed on the electronic device 10; therefore, the distance from the target object to the electronic device 10 may be equal to the distance from the target object to the light sensor 12. However, in another embodiment, the light sensor 12 may be disposed independently from the electronic device 10, and thus the determined distance may also be the distance from the target object to the light sensor 12.

In an embodiment, the preparation stage is not required if the base brightness tables required by the application stage is already stored in the storage circuit 13 before the electronic device 10 is merchandised. Alternatively, operations taken in the preparation stage may also be taken to correct or adjust the base brightness tables stored in the storage circuit 13.

Figure 2:
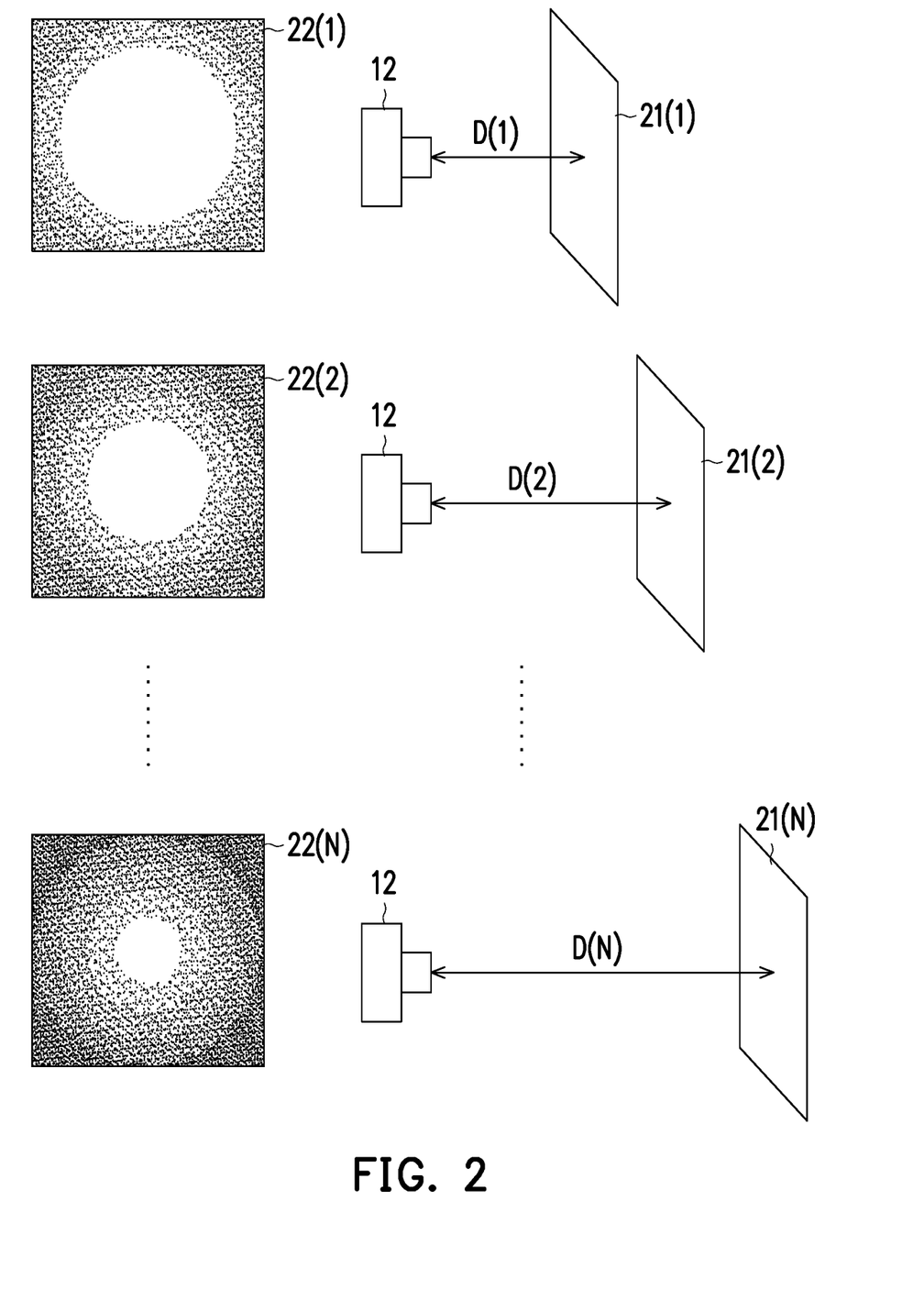
FIG. 2 and FIG. 3 are schematic views illustrating actions taken at a preparation stage according to an embodiment of the disclosure.
Figure 3:
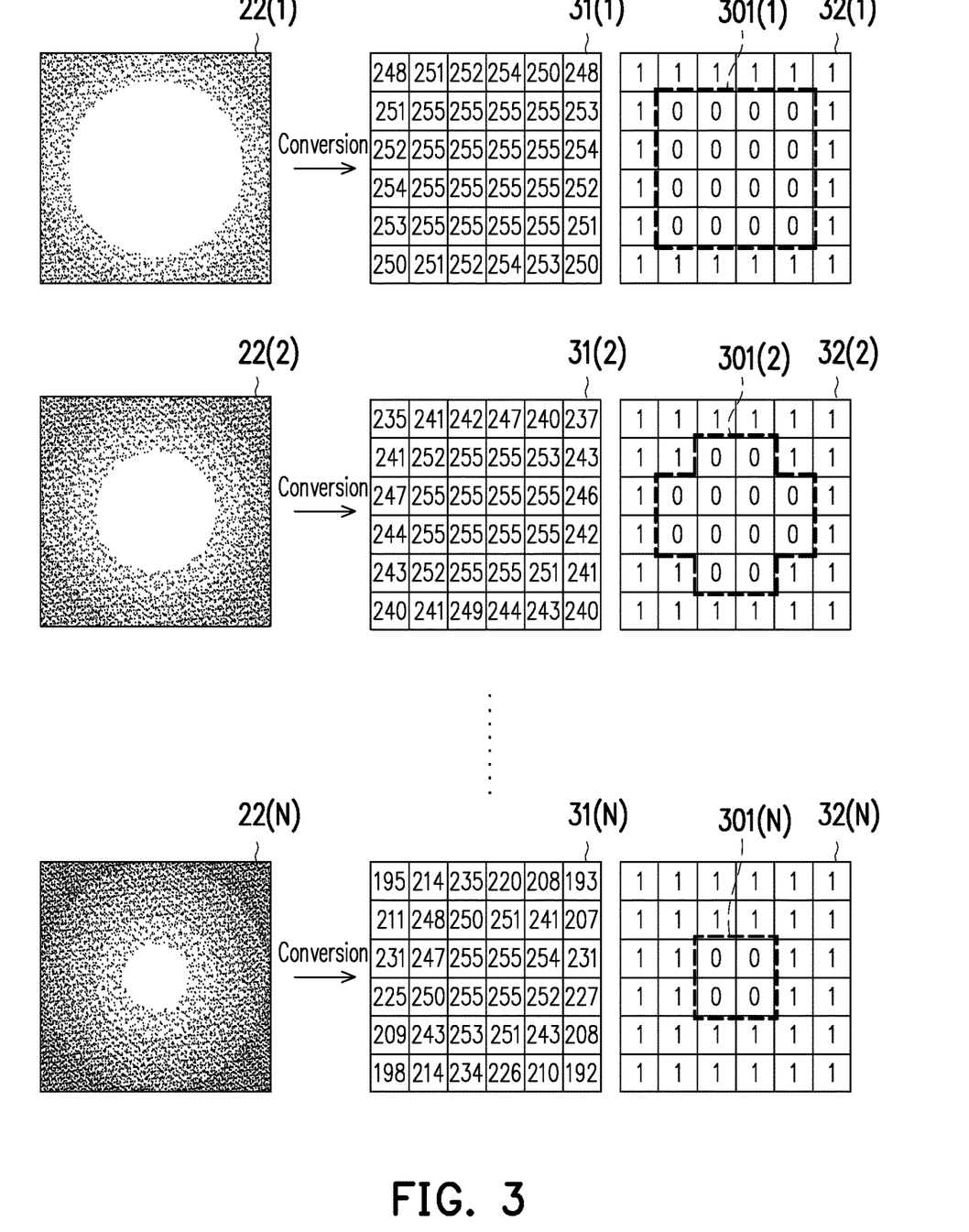

FIG. 2 and FIG. 3 are schematic views illustrating actions taken at a preparation stage according to an embodiment of the disclosure. With reference to FIG. 1 and FIG. 2, during the preparation stage, the light sensor 12 may sequentially detect distribution of light (i.e., base light) reflected by objects 21(1)-21(N) (also referred to as base objects), so as to generate a plurality of gray-scale images. N may be any integer greater than or equal to 2. The objects 21(1)-21(N) are respectively spaced from the light sensor 12 by distances D(1)-D(N) (also referred to as base distances), and the distances D(1)-D(N) gradually increase. Besides, the distance D(1) corresponds to a first distance level, the distance D(2) corresponds to a second distance level, and the distance D(N) corresponds to an $N^{th}$ distance level.

The distribution of light reflected from by the objects 21(1)-21(N) may be shown as the gray-scale images 22(1)-22(N). For instance, the smaller the distance between a base object and the light sensor 12, the greater the overall brightness of the detected light. On the contrary, the greater the distance between a base object and the light sensor 12, the less the overall brightness of the detected light. Besides, the brightness of the detected light increases when approaching the center of the gray-scale image. The processor 14 may establish a base brightness table corresponding to a certain distance level according to the detected light.

With reference to FIG. 1 and FIG. 3, the processor 14 may respectively convert the brightness distribution shown in the gray-scale images 22(1)-22(N) into the base brightness tables 31(1)-31(N). Information (i.e., base brightness information) recorded in the base brightness tables 31(1)-31(N) reflect the brightness distribution shown in the gray-scale images 22(1)-22(N). Each of the base brightness tables 31(1)-31(N) has a plurality of pixel locations, and each of the pixel locations may record one brightness value. In the present embodiment, the range of the brightness values may be 0-255. The brightness value recorded in one of the pixel locations is positively correlated to the brightness of the light detected at the pixel location. Here, if the brightness value is 0, it indicates that almost no light is detected, and if the brightness value is 255, it indicates that the light with the greatest brightness is detected. For instance, corresponding to the brightness distribution shown in the gray-scale image 22(1), the values recorded in the 16 pixel locations at the center of the base brightness table 31(1) are 255, and the values recorded in the other pixel locations are less than 255. For instance, corresponding to the brightness distribution shown in the gray-scale image 22(2), the values recorded in the 12 pixel locations at the center of the base brightness table 31(2) are 255, and the values recorded in the other pixel locations are less than 255. For instance, corresponding to the brightness distribution shown in the gray-scale image 22(N), the values recorded in the 4 pixel locations at the center of the base brightness table 31(N) are 255, and the values recorded in the other pixel locations are less than 255.

In the present embodiment, the maximum brightness value is 255. However, in fact, light with different brightnesses may have the same brightness value of 255. That is, if the brightnesses of the detected lights exceed a predetermined brightness, the brightness values of these lights may be recorded as 255 in the base brightness tables, which may further lead to an error in the estimated distances. Therefore, in the present embodiment, the brightness value of 255 in the base brightness tables may be considered as invalid information (or meaningless information) and may be filtered out during the subsequent application stage.

In the present embodiment, the processor 14 may analyze the base brightness tables 31(1)-31(N) to establish mask tables 32(1)-32(N). For instance, according to the pixel location recording the brightness value of 255 in the base brightness table 31(1), the processor 14 may set the numeral values recorded in the same pixel locations (within the range marked by a dotted line 301(1)) in the mask table 32(1) as a preset value (e.g., 0) and set the numeral values recorded in the other pixel locations in the mask table 32(1) as the other present value (e.g., 1). For instance, according to the pixel location recording the brightness value of 255 in the base brightness table 31(2), the processor 14 may set the numeral values recorded in the same pixel locations (within the range marked by a dotted line 301(2)) in the mask table 32(2) as a preset value (e.g., 0) and set the numeral values recorded in the other pixel locations in the mask table 32(2) as the other present value (e.g., 1). For instance, according to the pixel location recording the brightness value of 255 in the base brightness table 31(N), the processor 14 may set the numeral values recorded in the same pixel locations (within the range marked by a dotted line 301(N)) in the mask table 32(N) as a preset value (e.g., 0) and set the numeral values recorded in the other pixel locations in the mask table 32(N) as the other present value (e.g., 1). Thereby, the mask tables 32(1)-32(N) may be configured to filter out the invalid information in the base brightness tables 31(1)-31(N), and the non-filtered information in the base brightness tables 31(1)-31(N) may be considered as valid information.

In the base brightness tables corresponding to different distance levels, the number of the pixel locations recording the invalid information may alter. For instance, as shown in FIG. 3, the brightness value of 255 is recorded in 16 pixel locations in the base brightness table 31(1), in 12 pixel locations in the base brightness table 31(2), and in 4 pixel locations in the base brightness table 31(N). In the mask tables 32(1)-32(N) corresponding to different distance levels, the number of the pixel locations within the range marked by the dotted lines 301(1)-301(N) may alter as well. Besides, the established base brightness tables 31(1)-31(N) and mask tables 32(1)-32(N) may be stored in the storage circuit 13 for later use in the subsequent application stage.

Figure 4:
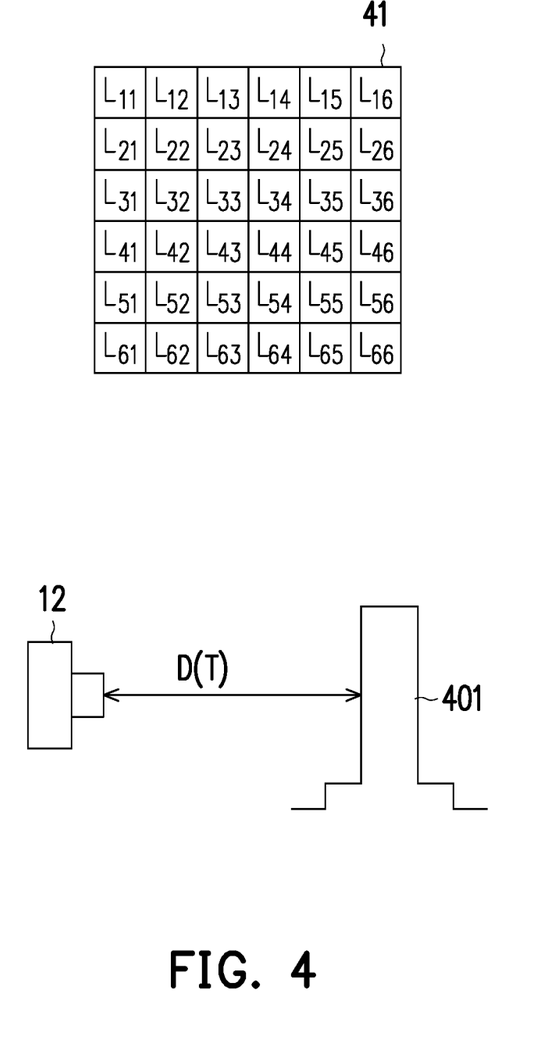

FIG. 4 and FIG. 5 are schematic views illustrating actions taken at an application stage according to an embodiment of the disclosure. With reference to FIG. 1 and FIG. 4, in the application stage, the light sensor 12 may detect a light reflected by an object 401 (i.e., the target object). The object 401 is spaced from the light sensor 12 by a distance D(T) that requires estimation. According to the gray-scale image generated according to the detected light, the processor 14 may establish an object brightness table 41. Besides, similar to the embodiment shown in FIG. 3, the processor 14 in the present embodiment may convert the brightness distribution of the detected lights corresponding to a plurality of pixel locations into information (i.e., object brightness information) recorded in the object brightness table 41. For instance, the object brightness table 41 may record brightness values $L_{11}$-$L_{66}$ to reflect the brightness distribution of the detected lights corresponding to the pixel locations. In the object brightness table 41, for example, the brightness value recorded in a certain pixel location may be represented by 0-255, so as to reflect the brightness (or the gray-scale brightness) of the light corresponding to this pixel location.

After obtaining the object brightness table 41, the processor 14 may compare the object brightness information recorded in the object brightness table 41 with the base brightness information recorded in the base brightness tables 31(1)-31(N) depicted in FIG. 3 and obtain differential quantitative information according to the differences observed from the comparison. In the present embodiment, the processor 14 may further obtain valid information in the object brightness table 41 according to the mask tables 32(1)-32(N) depicted in FIG. 3 and make comparison (only) with use of the valid information in the object brightness table 41. For instance, when comparing the object brightness table 41 with the base brightness table 31(1) corresponding to the first distance level, the processor 14 may refer to the mask table 32(1) to obtain valid information recorded in the object brightness table 41 corresponding to the first distance level, and the processor 14 compares the valid information recorded in the object brightness table 41 corresponding to the first distance level with the valid information recorded in the base brightness table 31(1), so as to obtain the differential quantitative information corresponding to the first distance level. When comparing the object brightness table 41 with the base brightness table 31(N) corresponding to the $N^{th}$ distance level, the processor 14 may refer to the mask table 32(N) to obtain valid information recorded in the object brightness table 41 corresponding to the $N^{th}$ distance level, and the processor 14 compares the valid information recorded in the object brightness table 41 corresponding to the $N^{th}$ distance level with the valid information recorded in the base brightness table 31(N), so as to obtain the differential quantitative information corresponding to the $N^{th}$ distance level.

The differential quantitative information corresponding to a certain distance level may reflect a difference level between the object brightness information in the object brightness table 41 and the base brightness information in the base brightness table corresponding to the distance level. For instance, if the difference between the object brightness information in the object brightness table 41 and the base brightness information in the base brightness table 31(1) are small in average, it indicates that the difference level between the object brightness information in the object brightness table 41 and the base brightness information in the base brightness table 31(1) is comparatively low. By contrast, if the difference between the object brightness information in the object brightness table 41 and the base brightness information in the base brightness table 31(1) are large in average, it indicates that the difference level between the object brightness information in the object brightness table 41 and the base brightness information in the base brightness table 31(1) is comparatively high.

According to the differential quantitative information corresponding to the first distance level to the $N^{th}$ distance level, the processor 14 may determine one of the distances D(1)-D(N) in FIG. 2 as a target base distance. For example, after obtaining the differential quantitative information corresponding to the first distance level to the $N^{th}$ distance level, the processor 14 may recognize the lowest difference level between the object brightness information in the object brightness table 41 and the base brightness information in the base brightness table corresponding to a certain distance level. The processor 14 may determine the base distance corresponding to this distance level as the target base distance. According to the determined target base distance, the processor 14 may determine the distance D(T). For instance, if the difference level between the object brightness information in the object brightness table 41 and the base brightness information in the base brightness table 31(2) is the lowest level, the processor 14 may determine the distance D(T) according to the distance D(2) (i.e., the target base distance). The processor 14 may, for example, determine the distance D(T) to be the same as the distance D(2); alternatively, the processor 14 may perform a logic calculation on the distance D(2) to obtain the distance D(T), which should however not be construed as a limitation in the disclosure.

With reference to FIG. 1 and FIG. 5, in the present embodiment, the processor 14 may respectively perform comparison operations corresponding to the first distance level to the $N^{th}$ distance level. In the comparison operation corresponding to the first distance level, the processor 14 may multiply the object brightness information in the object brightness table 41 by the value in the corresponding pixel location in the mask table 32(1) to obtain the valid information and then calculate the difference between the valid information and the information recorded in the corresponding pixel location in the base brightness table 31(1), so as to obtain a differential quantitative table 51(1). Thereby, on the premise of not considering the invalid information in the object brightness table 41 and in the base brightness table 31(1), the differential quantitative table 51(1) may include 20 (valid) numeral values $V_{11}$-$V_{16}$, $V_{21}$, $V_{26}$, $V_{31}$, $V_{36}$, $V_{41}$, $V_{46}$, $V_{51}$, $V_{56}$, and $V_{61}$-$V_{66}$. For instance, the numeral value $V_{11}$ is obtained by subtracting 248 from the numeral value $L_{11}$ (or subtracting the numeral value $L_{11}$ from 248), the numeral value $V_{12}$ is obtained by subtracting 251 from the numeral value $L_{12}$ (or subtracting the numeral value $L_{12}$ from 251), the numeral value $V_{13}$ is obtained by subtracting 252 from the numeral value $L_{13}$ (or subtracting the numeral value $L_{13}$ from 252), and the rest may be deduced therefrom.

In the comparison operation corresponding to the second distance level, the processor 14 may multiply the object brightness information in the object brightness table 41 by the value in the corresponding pixel location in the mask table 32(2) to obtain the valid information and then calculate the difference between the valid information and the information recorded in the corresponding pixel location in the base brightness table 31(2), so as to obtain a differential quantitative table 51(2). Thereby, on the premise of not considering the invalid information in the object brightness table 41 and in the base brightness table 31(2), the differential quantitative table 51(2) may include 24 (valid) numeral values $V_{11}$-$V_{16}$, $V_{21}$, $V_{22}$, $V_{25}$, $V_{26}$, $V_{31}$, $V_{36}$, $V_{41}$, $V_{46}$, $V_{51}$, $V_{52}$, $V_{55}$, $V_{56}$, and $V_{61}$-$V_{66}$. In light of the above, in the comparison operation corresponding to the $N^{th}$ distance level, the processor 14 may multiply the object brightness information in the object brightness table 41 by the value in the corresponding pixel location in the mask table 32(N) to obtain the valid information and then calculate the difference between the valid information and the information recorded in the corresponding pixel location in the base brightness table 31(N), so as to obtain a differential quantitative table 51(N). Thereby, on the premise of not considering the invalid information in the object brightness table 41 and in the base brightness table 31(N), the differential quantitative table 51(N) may include 32 (valid) numeral values $V_{11}$-$V_{16}$, $V_{21}$-$V_{26}$, $V_{31}$, $V_{32}$, $V_{35}$, $V_{36}$, $V_{41}$, $V_{42}$, $V_{45}$, $V_{46}$, $V_{51}$-$V_{56}$, and $V_{61}$-$V_{66}$.

The processor 14 may respectively determine the difference level between the object brightness information in the object brightness table 41 and the base brightness information in the base brightness tables 31(1)-31(N) according to the differential quantitative tables 51(1)-51(N). For instance, the processor 14 may calculate the sum of the numeral values $V_{11}$-$V_{16}$, $V_{21}$, $V_{26}$, $V_{31}$, $V_{36}$, $V_{41}$, $V_{46}$, $V_{51}$, $V_{56}$, and $V_{61}$-$V_{66}$ in the differential quantitative table 51(1) and divide the sum by 20 to obtain a differential quantitative value corresponding to the first distance level. The differential quantitative value corresponding to the first distance level may reflect the difference level (or the difference in the average of the numeral values) between the object brightness information in the object brightness table 41 and the base brightness information in the base brightness table 31(1). The processor 14 may calculate the sum of the numeral values $V_{11}$-$V_{16}$, $V_{21}$, $V_{22}$, $V_{25}$, $V_{26}$, $V_{31}$, $V_{36}$, $V_{41}$, $V_{46}$, $V_{51}$, $V_{52}$, $V_{55}$, $V_{56}$, and $V_{61}$-$V_{66}$ in the differential quantitative table 51(2) and divide the sum by 24 to obtain the differential quantitative value corresponding to the second distance level. The differential quantitative information corresponding to the second distance level may reflect the difference level (or the difference in the average of the numeral values) between the object brightness information in the object brightness table 41 and the base brightness information in the base brightness table 31(2). It may be deduced from the above that the processor 14 may calculate the sum of the numeral values $V_{11}$-$V_{16}$, $V_{21}$-$V_{26}$, $V_{31}$, $V_{32}$, $V_{35}$, $V_{36}$, $V_{41}$, $V_{42}$, $V_{45}$, $V_{46}$, $V_{51}$-$V_{56}$, and $V_{61}$-$V_{66}$ in the differential quantitative table 51(N) and divide the sum by 32 to obtain the differential quantitative value corresponding to the $N^{th}$ distance level. The differential quantitative value corresponding to the $N^{th}$ distance level may reflect the difference level (or the difference in the average of the numeral values) between the object brightness information in the object brightness table 41 and the base brightness information in the base brightness table 31(N).

According to the N differential quantitative values corresponding to the first distance level to the $N^{th}$ distance level, the processor 14 may determine the target base distance. For instance, among the obtained N differential quantitative values, it is assumed that the differential quantitative value corresponding to the second distance level is the smallest value; thereby, the processor 14 may determine the distance D(2) depicted in FIG. 2 corresponding to the second distance level as the target base distance and determine the to-be-estimated distance D(T) in FIG. 4 according to the distance D(2).

The mask tables are configured to filter out the invalid information in the object brightness table in the previous embodiments, for instance; however, this should not be construed as a limitation in the disclosure. The mask table may not be used for estimating the distance in another embodiment of the disclosure. For instance, in another embodiment shown in FIG. 5, the processor 14 may (directly) evaluate the difference levels between the object brightness information in the object brightness table 41 and the base brightness information in the base brightness tables 31(1)-31(N), and it is not necessary to multiply the object brightness information in the object brightness table 41 by the values in the corresponding pixel locations in the mask tables 32(1)-32(N). Namely, in the embodiment where no mask table is used, the processor 14 does not need to consider the condition that the brightness value of 255 may result in the distortion of the brightness, and other operations are similar or identical to those explained in the previous embodiments and therefore will not be further described below. Besides, in an embodiment, any algorithm applicable to evaluate the level of difference (i.e., the difference level) between the information in the object brightness table 41 and the information in the base brightness table may be used to replace or amend the rules of algorithm depicted in FIG. 5, which should not be construed as a limitation in the disclosure.

In an embodiment, the detected reflected light may include the light reflected by objects (also referred to as background objects) other than the target object. Hence, the processor 14 may further filter out background information in the object brightness information. Namely, the background information may include the brightness information corresponding to the light reflected by the background object. For instance, after the initial establishment of the object brightness table, the processor 14 may further consider the information of the brightness value in the object brightness table being smaller than a predetermined brightness threshold as the background information and filter out the background information. For instance, as exemplarily shown in FIG. 4, if the numeral value $L_{11}$ in the object brightness table 41 is smaller than the predetermined brightness threshold (e.g., 50), the numeral value $L_{11}$ may be considered as the background information and may be filtered out. The filtered background information in the object brightness table 41 may not be taken into consideration for calculating the differential quantitative information.

In an embodiment, the processor 14 may also detect and/or filter out the background information in the object brightness table by analyzing the distribution range and/or the distribution shape of the brightness information meeting a specific condition in the object brightness table 41. For instance, in an embodiment shown in FIG. 4, although the numeral value $L_{25}$ in the object brightness table 41 is greater than the predetermined brightness threshold, the processor 14 may consider the numeral value $L_{25}$ as well as the neighboring numeral values $L_{14}$, $L_{15}$, $L_{16}$, $L_{24}$, $L_{26}$, $L_{35}$, and $L_{36}$ as the background information. This is because the neighboring numeral values $L_{14}$, $L_{15}$, $L_{16}$, $L_{24}$, $L_{26}$, $L_{35}$, and $L_{36}$ are all smaller than the predetermined brightness threshold. Alternatively, according to an embodiment shown in FIG. 4, in the object brightness table 41, 16 numeral values $L_{11}$-$L_{14}$, $L_{21}$-$L_{24}$, $L_{31}$-$L_{34}$, and $L_{41}$-$L_{44}$ fall within the same numeral range (also referred to as the first numeral range), 6 numeral values $L_{51}$-$L_{53}$ and $L_{61}$-$L_{63}$ fall within the same numeral range (also referred to as the second numeral range), 6 numeral values $L_{15}$, $L_{16}$, $L_{25}$, $L_{26}$, $L_{35}$, and $L_{36}$ fall within the same numeral range (also referred to as the third numeral range), and 8 numeral values $L_{45}$, $L_{46}$, $L_{54}$-$L_{56}$, and $L_{64}$-$L_{66}$ fall within the same numeral range (also referred to as the fourth numeral range). The first to fourth numeral ranges are different from one another. As such, the processor 14 may consider the numeral range that includes the greatest number of close numeral values (i.e., the first numeral range) as not including the background information, and the information falling within the other numeral ranges (i.e., the second to fourth numeral ranges) may be considered as the background information. In an embodiment, the operation of determining the background information according to different numeral ranges may also be considered as an operation of adopting watershed image segmentation to identify the background information in the object brightness table.

In an embodiment, the processor 14 may also detect or filter out the background information in the object brightness table by a plurality of continuing light gray-scale images. For instance, on the premise of assuming that the light sensor 12 is not moved, the background information of the continuing light gray-scale images (or the brightness distribution of light) should remain unchanged. Hence, in an embodiment, the processor 14 may analyze a plurality of object brightness tables corresponding to the brightness distribution of light detected at a plurality of continuing time points. If the brightness value recorded in a specific pixel location in the object brightness tables stay the same, the processor 14 may determine the brightness value recorded in the specific pixel location as the background information. Alternatively, the processor 14 may, at the beginning of the application stage, store a detected initial object brightness table as a background image, and the subsequently detected object brightness tables may be compared with the background image for filtering out the background information therein. In an embodiment, the operation of determining the background information according to the object brightness tables detected at a plurality of time points may also be considered as an operation of adopting background subtraction to identify the background information in the object brightness table. Other image processing methods or optical algorithms may also be applied to identify the background information in the object brightness table, which should not be limited in the disclosure.

Figure 6:
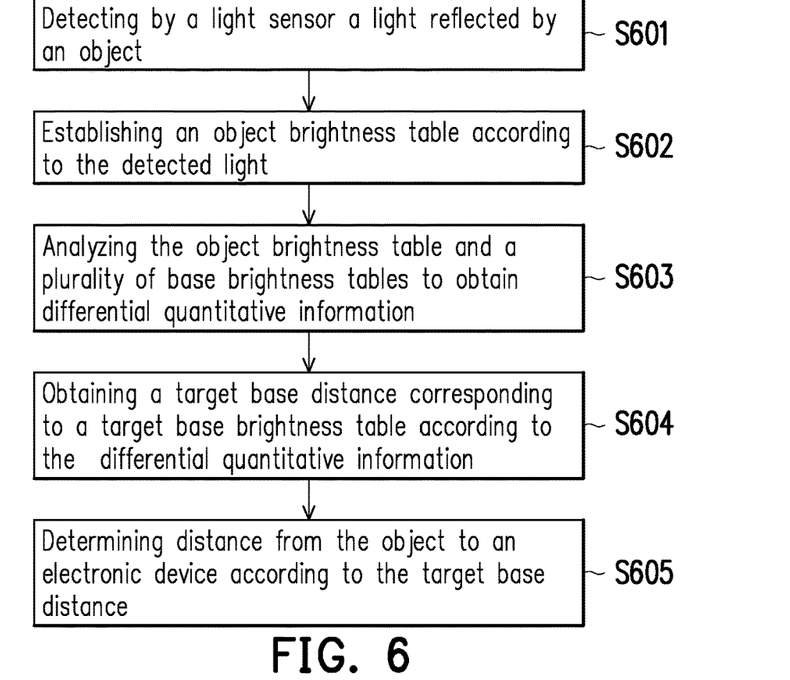
FIG. 6 is a flowchart illustrating a method for estimating an object distance according to an embodiment of the disclosure.

FIG. 6 is a flowchart illustrating a method for estimating an object distance according to an embodiment of the disclosure. With reference to FIG. 6, in step S601, a light sensor detects a light reflected by an object (i.e., the target object). In step S602, an object brightness table is established according to the detected light. In step S603, the object brightness table and a plurality of base brightness tables are analyzed to obtain differential quantitative information. In step S604, a target base distance corresponding to a target base brightness table is obtained according to the differential quantitative information. In step S605, a distance from the object to the electronic device is determined according to the target base distance.

Figure 7:
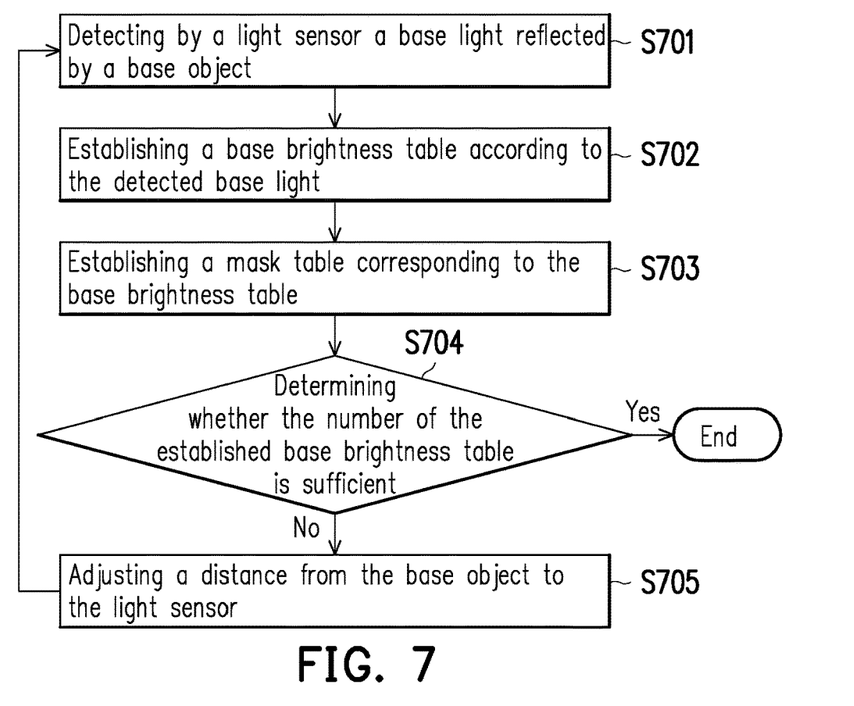
FIG. 7 and FIG. 8 are flowcharts illustrating a method for estimating an object distance according to another embodiment of the disclosure.

FIG. 7 and FIG. 8 are flowcharts illustrating a method for estimating an object distance according to another embodiment of the disclosure. With reference to FIG. 7, in an embodiment, the preparation stage of the method for estimating the object distance may include steps S701-S705. In step S701, a light sensor detects a base light reflected by a base object. In step S702, a base brightness table is established according to the detected base light. In step S703, a mask table corresponding to the base brightness table is established. In step S704, whether the number of the established base brightness table is sufficient is determined. If the embodiment depicted in FIG. 2 is taken for example, whether N base brightness tables are established may be determined. If the number of the established base brightness table is insufficient, e.g., if N base brightness tables have not yet been established, in step S705, a distance from the light sensor and the base object is adjusted. For instance, the distance from the light sensor and the base object is adjusted from D(1) to D(2) depicted in FIG. 2. On the contrary, if the number of the established base brightness table is sufficient, e.g., if N base brightness tables have been established, the preparation stage may end.

Figure 8:
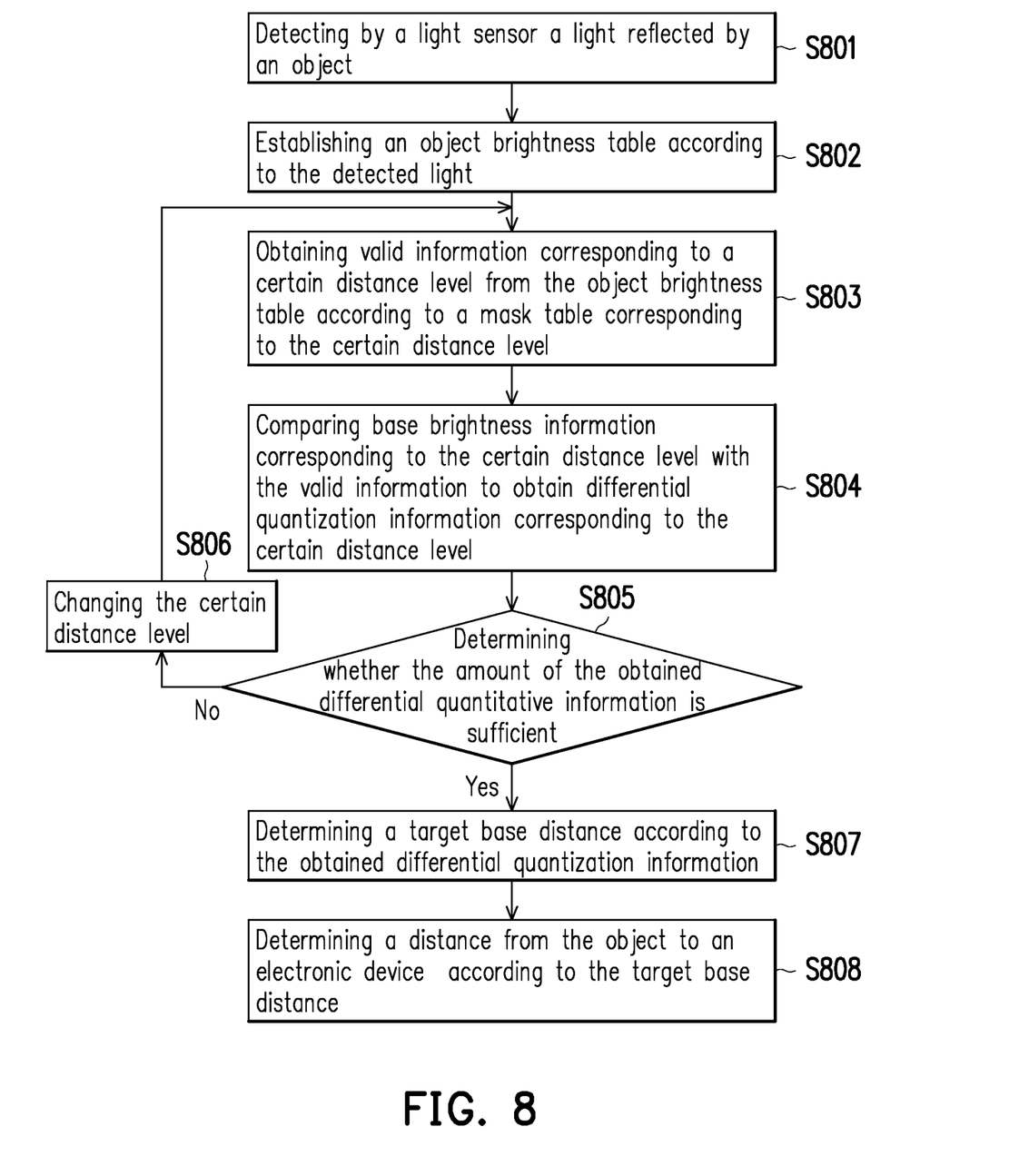

With reference to FIG. 8, in an embodiment, the application stage of the method for estimating the object distance may include steps S801-S808. In step S801, a light sensor detects a light reflected by an object (i.e., the target object). In step S802, an object brightness table is established according to the detected light. In step S803, valid information corresponding to a certain distance level is obtained from the object brightness table according to a mask table corresponding to the certain distance level. In step S804, base brightness information corresponding to the certain distance level is compared with the valid information to obtain differential quantization information corresponding to the certain distance level. In step S805, whether the amount of the obtained differential quantization information is sufficient is determined. If the embodiment depicted in FIG. 5 is taken for example, whether N differential quantization tables or N differential quantization values are obtained may be determined. If the amount of the obtained differential quantization information is insufficient, e.g., if N differential quantization tables or N differential quantization values have not yet been obtained, in step S806, the certain distance level is changed (e.g., the certain distance level is changed from a first distance level to a second distance level), and steps S803-S805 are repeatedly performed. If the amount of the obtained differential quantization information is sufficient, e.g., if N differential quantization tables or N differential quantization values have been obtained, in step S807, a target base distance is determined according to the obtained differential quantization information. In step S808, a distance from the object to the electronic device is determined according to the target base distance.

Each step depicted in FIG. 6 to FIG. 8 may be performed in form of a plurality of programming codes or circuits, which should however not be construed as a limitation in the disclosure. Besides, the method depicted in FIG. 6 to FIG. 8 may be applied according to the exemplary embodiments provided above or may be applied independently, which should however not be construed as a limitation in the disclosure.

To sum up, after the light sensor detects the light reflected by the target object, the object brightness table may be established according to the detected light, and the object brightness table records the object brightness information of the light corresponding to a plurality of pixel locations. Through analyzing the differences between the object brightness table and the base brightness tables, the differential quantitative information may be obtained. The differential quantitative information may be applied to determine a target base distance, and the distance from the object to the electronic device may be determined according to the target base distance. Comparing to measuring a distance to a distant object (or a depth) by stereo vision or structure light detection, the number of lens required may be less with reference to the embodiments of the disclosure, and a number of complicated or expensive analysis instruments are not required. Besides, comparing to measuring a distance to (or a depth of) a distant object by means of light reflection time or TOF, the brightness value of the detected light is the only consideration according to one or more embodiments of the disclosure, and it is not necessary to precisely measure the light flight time. As such, the light sensor may be applied together with simple algorithm to roughly estimate the distance from the distant object and the electronic device according to one or more embodiments of the disclosure, so as to effectively reduce the hardware costs and increase the computation efficiency. Said advantages may be further exploited to the full if it is intended to obtain the rough depth of the object.

It will be apparent to those skilled in the art that various modifications and variations can be made to the structure described in the disclosure without departing from the scope or spirit of the disclosure. In view of the foregoing, it is intended that the disclosure cover modifications and variations provided they fall within the scope of the following claims and their equivalents.

What is claimed is:

1. A method for estimating an object distance, the method being applied by an electronic device having a light sensor to estimate a distance from an object to the electronic device and the method comprising:
   obtaining a plurality of base brightness tables each corresponding to one base distance;
   detecting, by the light sensor, a light reflected from the object;
   establishing an object brightness table according to the detected light, wherein the object brightness table records object brightness information of the light corresponding to a plurality of pixel locations;
   analyzing a difference between the object brightness table and the plurality of base brightness tables to obtain differential quantitative information;
   comparing the differential quantitative information to choose a target base brightness table from the plurality of base brightness tables and determining a base distance corresponding to the chosen target base brightness table as a target base distance; and
   determining the distance from the object to the electronic device as the target base distance.

2. The method as recited in claim 1, wherein the plurality of base brightness tables comprises a first base brightness table and a second base brightness table, and the method further comprises:
   detecting, by the light sensor, a first base light reflected by a first base object, wherein the light sensor and the first base object are spaced from each other by a first base distance;
   establishing the first base brightness table according to the detected first base light, wherein the first base brightness table records first base brightness information of the first base light corresponding to the plurality of pixel locations;
   detecting, by the light sensor, a second base light reflected by a second base object, wherein the light sensor and the second base object are spaced from each other by a second base distance, and the first base distance is different from the second base distance; and
   establishing the second base brightness table according to the detected second base light, wherein the second base brightness table records second base brightness information of the second base light corresponding to the plurality of pixel locations.

3. The method as recited in claim 2, further comprising:
   analyzing the first base brightness table to establish a first mask table; and
   analyzing the second base brightness table to establish a second mask table,
   wherein the first mask table is configured to filter out first invalid information in the first base brightness table, and the second mask table is configured to filter out second invalid information in the second base brightness table.

4. The method as recited in claim 3, wherein a number of at least one first pixel location recording the first invalid information in the first base brightness table is different from a number of at least one second pixel location recording the second invalid information in the second base brightness table.

5. The method as recited in claim 1, wherein the plurality of base brightness tables comprises a first base brightness table and a second base brightness table, and the step of analyzing the difference between the object brightness table and the plurality of base brightness tables to obtain the differential quantitative information comprises:
comparing the object brightness information and first base brightness information recorded in the first base brightness table to obtain first differential quantitative information;
comparing the object brightness information and second base brightness information recorded in the second base brightness table to obtain second differential quantitative information; and
determining a first base distance corresponding to the first base brightness table as the target base distance according to the first differential quantitative information and the second differential quantitative information.

6. The method as recited in claim 5, further comprising:
obtaining a first differential quantitative value according to the first differential quantitative information; and
obtaining a second differential quantitative value according to the second differential quantitative information,
wherein the first differential quantitative value is smaller than the second differential quantitative value.

7. The method as recited in claim 5, wherein the step of comparing the object brightness information and the first base brightness information recorded in the first base brightness table to obtain the first differential quantitative information comprises:
obtaining a first valid information from the object brightness information according to a first mask table; and
comparing the first valid information and the first base brightness information to obtain the first differential quantitative information,
wherein the step of comparing the object brightness information and the second base brightness information recorded in the second base brightness table to obtain the second differential quantitative information comprises:
obtaining a second valid information from the object brightness information according to a second mask table; and
comparing the second valid information and the second base brightness information to obtain the second differential quantitative information.

8. The method as recited in claim 1, wherein the step of analyzing the difference between the object brightness table and the plurality of base brightness tables to obtain the differential quantitative information comprises:
filtering out background information in the object brightness information.

9. The method as recited in claim 1, wherein the light sensor comprises an optical lens.

10. The method as recited in claim 1, further comprising: emitting the light by a light emitter.

11. An electronic device configured to estimate a distance from an object to the electronic device, and the electronic device comprising:
a light sensor;
a storage circuit, configured to store a plurality of base brightness tables each corresponding to one base distance; and
a processor, coupled to the light sensor and the storage circuit,
wherein the processor is configured to detect, by the light sensor, a light reflected by the object and establish an object brightness table according to the detected light, and the object brightness table records object brightness information of the light corresponding to a plurality of pixel locations;
wherein the processor is further configured to analyze a difference between the object brightness table and the plurality of base brightness tables to obtain differential quantitative information and compare the differential quantitative information to choose a target base brightness table from the plurality of base brightness tables, and the processor is further configured to determine a base distance corresponding to the chosen target base brightness table as a target base distance, and
wherein the processor is further configured to determine the distance from the object to the electronic device as the target base distance.

12. The electronic device as recited in claim 11, wherein the plurality of base brightness tables comprises a first base brightness table and a second base brightness table, and the processor is further configured to:
detect, by the light sensor, a first base light reflected by a first base object, wherein the light sensor and the first base object are spaced from each other by a first base distance,
establish the first base brightness table according to the detected first base light, wherein the first base brightness table records first base brightness information of the first base light corresponding to the plurality of pixel locations;
detect, by the light sensor, a second base light reflected by a second base object, wherein the light sensor and the second base object are spaced from each other by a second base distance, and the first base distance is different from the second base distance; and
establish the second base brightness table according to the detected second base light, wherein the second base brightness table records second base brightness information of the second base light corresponding to the plurality of pixel locations.

13. The electronic device as recited in claim 12, wherein the processor is further configured to:
analyze the first base brightness table to establish a first mask table; and
analyze the second base brightness table to establish a second mask table,
wherein the first mask table is configured to filter out first invalid information in the first base brightness table, and the second mask table is configured to filter out second invalid information in the second base brightness table.

14. The electronic device as recited in claim 13, wherein a number of at least one first pixel location recording the first invalid information in the first base brightness table is different from a number of at least one second pixel location recording the second invalid information in the second base brightness table.

15. The electronic device as recited in claim 11, wherein the plurality of base brightness tables comprises a first base brightness table and a second base brightness table, and the operation of analyzing the difference between the object brightness table and the plurality of base brightness tables to obtain the differential quantitative information by the processor comprises:
- comparing the object brightness information and first base brightness information recorded in the first base brightness table to obtain first differential quantitative information;
- comparing the object brightness information and second base brightness information recorded in the second base brightness table to obtain second differential quantitative information; and
- determining a first base distance corresponding to the first base brightness table as the target base distance according to the first differential quantitative information and the second differential quantitative information.

16. The electronic device as recited in claim 15, wherein the processor is further configured to obtain a first differential quantitative value according to the first differential quantitative information and obtain a second differential quantitative value according to the second differential quantitative information, and the first differential quantitative value is smaller than the second differential quantitative value.

17. The electronic device as recited in claim 15, wherein the operation of comparing the object brightness information and the first base brightness information recorded in the first base brightness table to obtain the first differential quantitative information by the processor comprises:
- obtaining a first valid information from the object brightness information according to a first mask table; and
- comparing the first valid information and the first base brightness information to obtain the first differential quantitative information,
wherein the operation of comparing the object brightness information and the second base brightness information recorded in the second base brightness table to obtain the second differential quantitative information by the processor comprises:
- obtaining a second valid information from the object brightness information according to a second mask table; and
- comparing the second valid information and the second base brightness information to obtain the second differential quantitative information.

18. The electronic device as recited in claim 11, wherein the operation of analyzing the difference between the object brightness table and the plurality of base brightness tables to obtain the differential quantitative information comprises:
- filtering out background information in the object brightness information.

19. The electronic device as recited in claim 11, wherein the light sensor comprises an optical lens.

20. The electronic device as recited in claim 11, further comprising:
- a light emitter, configured to emit the light.

* * * * *